March 29, 1966  J. N. MILLER  3,242,688
CONTROL MEANS AND REFRIGERATION SYSTEM THEREFOR
Filed Aug. 29, 1963  3 Sheets-Sheet 1

INVENTOR:
JOSEPH N. MILLER
BY Charles B. Navrostek
ATTORNEY.

March 29, 1966   J. N. MILLER   3,242,688
CONTROL MEANS AND REFRIGERATION SYSTEM THEREFOR
Filed Aug. 29, 1963   3 Sheets-Sheet 3

INVENTOR:
JOSEPH N. MILLER
BY Charles B. Haverstock
ATTORNEY.

United States Patent Office 3,242,688
Patented Mar. 29, 1966

3,242,688
CONTROL MEANS AND REFRIGERATION
SYSTEM THEREFOR
Joseph N. Miller, Overland, Mo., assignor to Jackes-Evans Manufacturing Company, St. Louis, Mo., a corporation of Missouri
Filed Aug. 29, 1963, Ser. No. 305,422
18 Claims. (Cl. 62—217)

The subject invention relates generally to control devices and systems therefor and more particularly to control means for refrigeration and cooling systems and the like and to the systems themselves.

There are many devices in existence for controlling refrigeration and cooling systems and the like, and there are many different kinds of refrigeration and cooling systems. There are also many devices and systems in existence which are controlled and operated by pressure and temperature responsive means. The known pressure and temperature responsive means, however, for the most part require relatively substantial pressures and pressure differentials for their operation, are incapable of maintaining accurate control within a close limitation, are relatively insensitive to small changes, and are relatively complicated and expensive to make, install and adjust. The known devices are therefore unsuitable for many applications.

These and other disadvantages and shortcomings of known control devices and systems are overcome by the present invention which teaches the construction and operation of novel means for controlling the operation of refrigeration and cooling equipment and the like and a novel system therefor. A refrigeration system constructed according to the present invention comprises a refrigeration or cooling unit having an inlet and an outlet, first and second temperature sensitive means responsive to the temperature produced at the outlet of the cooling unit, an expansion device in the inlet to the cooling unit including means connecting said expansion device to the first temperature sensitive means, a main valve connected in the outlet to said cooling unit, and pilot valve means operatively connected to the main valve for controlling the operation thereof, said pilot valve means being also operatively connected to the second temperature sensitive means. The subject system also comprises novel means for adjusting the operating temperature level of the pilot valve means.

A principal object of the present invention is to provide improved means for controlling the operation of refrigeration and cooling systems.

Another object is to provide greater sensitivity in the control of refrigeration and cooling systems.

Another object is to provide relatively inexpensive means for controlling refrigeration and cooling equipment.

Another object is to more accurately control the temperature in a refrigerated environment.

Another object is to control the temperature of a refrigeration or cooling unit using a relatively small pressure differential.

Another object is to prevent vapor freeze up in refrigeration or cooling systems without limiting the evaporator capacity.

Another object is to simplify the construction, installation and maintenance of refrigeration equipment and the like.

Another object is to provide improved pilot operated valve control means.

Another object is to limit the pressure differential that can be produced across the control device in a temperature controlled system.

These and other objects and advantages of the present invention will become apparent after considering the following detailed specification which discloses several preferred embodiments of the present invention in conjunction with the accompanying drawings, wherein.

Figure 1:
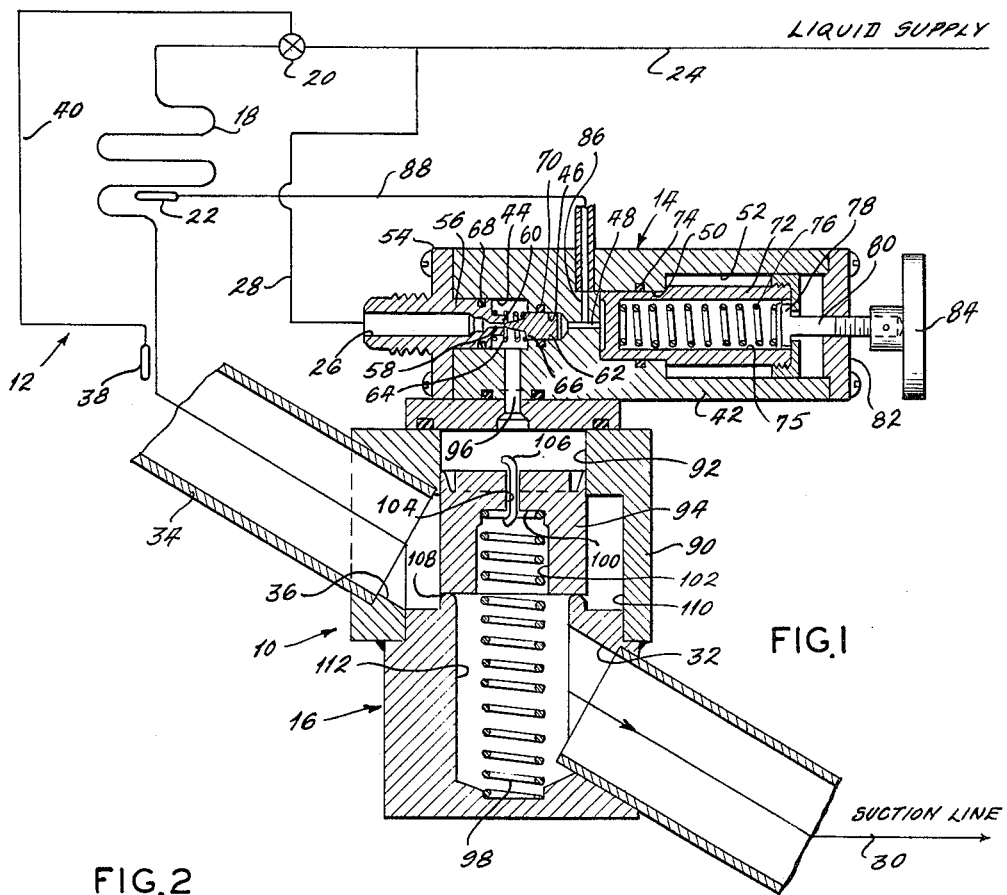
FIG. 1 is a cross-sectional view of a control valve for a refrigeration or cooling system and the like constructed according to the present invention, said view also including a schematic of a refrigeration system in which the subject valve is connected.

Referring to FIG. 1 of the drawings more particularly by reference numbers, the number 10 is a control valve constructed according to the present invention. The valve 10 is connected into a refrigerator system 12 and controls the system in a manner which will be described hereinafter. The valve 10 includes a pilot portion 14 and a main portion 16. The pilot and main valve portions can be constructed as a unit as shown or constructed as separate components and operated in different locations.

The refrigeration system in which the valve 10 is employed includes an evaporator 18, an expansion device 20, and a temperature responsive bulb 22 which is positioned in an environment that is controlled by the evaporator 18 and responds to the temperature of the said environment. The evaporator 18 can be used to cool a refrigerated display case, a refrigerator or any other cooling device including an air conditioner. The system includes an input fluid supply conduit 24 which can be connected to the outlet or high pressure side of a compressor or other high pressure fluid source. The conduit 24 is also connected to one side of the expansion device 20 and to a port 26 on the pilot portion 14 of the valve 10. The connection between the supply conduit 24 and the port 26 is by conduit 28. The refrigeration system also includes a suction or low pressure line 30 which is connected at one end to a main valve port 32 on the main valve portion 16. The opposite end of the conduit 30 is connected to the return side of the compressor or other source. Another conduit 34 is connected at one end to another main valve port 36 and at the opposite end to the outlet side of the evaporator 18. It is also contemplated to reverse the connections to the main valve ports 32 and 36 by reversing the connections of the conduits 30 and 34. A temperature responsive bulb 38 for controlling the operation of the expansion device 20 is positioned adjacent to the conduit 34 and is connected to the expansion device 20 by conduit 40. The operation of the expansion device 20 involves well known principles.

The pilot portion 14 of the valve 10 includes a housing 42 with aligned and connected bores 44, 46, 48, 50 and 52 extending therethrough. The bore 44 is at one end of the housing 42 and cooperatively and sealably receives a fitting member 54 which has the bore 26 extending therethrough. The fitting 54 also receives one end of the conduit 28. The fitting 54 has a portion 56 that extends into the bore 44, and the end of the portion 56 has a restricted orifice 58 through a reduced diameter portion 60 thereof. The end of the reduced diameter portion 60 forms a valve seat which cooperates with a movable valve member 62 that is slidably positioned in the bore 46. One end of a spring 64 is positioned around the reduced diameter end portion 60 of the fitting 54 and the opposite end of the spring engages a shoulder 66 formed on the movable member 62 to normally urge the member 62 away from the fitting portion 60 to open the orifice 58. Suitable O-rings 68 and 70 are provided in grooves around the fitting portion 56 and the valve member 62 to prevent leakage thereby.

Another larger movable member or piston 72 is slidably positioned in the bores 50 and 52, and is sealed to the bore 50 by an O-ring 74. The piston 72 has a counterbore 75 formed therein, and the counterbore receives a compression spring 76. One end of the compression spring 76 engages the end surface of the counterbore 75, and the opposite end of the spring 76 engages an adjustable member 78. The member 78 is connected to a threaded shaft 80, and the shaft 80 cooperates with a threaded passage in a closure member 82 that closes the associated end of the bore 52. The position of the member 78 and the piston 72 which is engaged therewith can be adjusted by rotating a knob 84. For example, when the knob 84 is turned in one direction the members 72 and 78 will move in one direction in the bores 50 and 52, and when the knob 84 is turned in the opposite direction the members 72 and 78 will move in the opposite direction therein.

Another bore 86 is formed in the housing 42 and connects the bore 48 to a conduit 88. The opposite end of the conduit 88 is connected to a temperature responsive device or bulb 22 positioned to respond to the temperature produced in a refrigeration unit or other cooling device by the evaporator 18. The bulb 22 can also be positioned in an airstream that is blown over the evaporator coils.

The pilot housing portion 42 is connected to another main housing portion 90 by suitable means such as bolts (not shown). The housing 90 has a cylindrical chamber 92 therein which slidably and sealably positions a main movable valve member or piston 94 and the cylindrical chamber 92 is connected to the bore 44 in the pilot housing 42 by passage 96. This means that when the pilot valve member 62 is not engaged with the member 60 closing the orifice 58 that the input fluid supply conduit 24 is in direct but restricted communication with the chamber 92 above the main valve member 94. This communication is limited because of the size of the passage 58 and is controlled by the pilot valve member 62 as will be shown.

The main valve member 94 is biased in an open position in the chamber 92 by a spring 98 which is compressed between the bottom wall of the housing 90 and a surface 100 formed in the valve member 94 at the end of a counterbore 102 therein. The member 94 also has a relatively small pressure limiting passage 104 therethrough, and a wire member 106 of predetermined cross-sectional area is positioned extending through the passage 104. The area around the member 106 in the passage 104 is carefully controlled as to size and provides an equalizer effect which limits the maximum possible pressure that can be produced across the main valve member 94. A plain equalizer orifice of controlled cross-sectional area can also be used for this purpose but because the area has to be so small an orifice with a wire is preferred because it better resists clogging and jamming.

A valve seat 108 is also formed in the housing 90 at the junction between chamber portion 110 and a lower smaller diameter chamber portion 112. The valve seat 108 cooperates with the lower peripheral portion of the valve member 94 as shown in FIG. 1 to control or prevent communication between the ports 32 and 36. When the main valve is open the ports 32 and 36 communicate and provide a return path from the evaporator 18 to the suction line 30, and when the main valve is closed the return path to the suction line is also closed.

One of the purposes of the present device is to control the opening and closing of the main valve port 108 and thereby regulate the return path from the evaporator. This in turn controls the amount of refrigeration or cooling produced by the evaporator 18. The control means in the subject device are responsive to the temperature produced and maintained by the evaporator 18.

The temperature responsive member 22 contains a suitable liquid or gaseous fluid which expands and contracts with changes in temperature. When the temperature goes down, for example, the fluid in the member 22 contracts and reduces the pressure in the bore 48. This in turn acts on the end surfaces of the valve members or pistons 62 and 72 and causes the members to move toward each other in their respective bores. In so doing, the piston 62 moves away from the member 60 and opens the valve seat at the end of the orifice 58. This establishes communication between the supply conduit 24 and the chamber 92 above the main piston 94 as aforesaid. This communication is through the conduit 28, the passages 26 and 58, the bore 44, and the passage 96. The relatively high pressure in the supply conduit 24 now acts on the upper surface of the main valve member 94 to move it downwardly in the chamber 92 as shown in the drawing. This in turn closes or partially closes the main valve seat 108 which controls the return path from the evaporator 18 to the suction line 30 of the compressor or other source (not shown). Since the temperature indicated by the bulb 22 is low relative to the control point for the valve, the closing of the main seat 108 is desired in order to slow down or deactivate the evaporator 18, and increase the temperature in the refrigerator or other controlled device. As the refrigerator temperature rises the fluid in the temperature sensitive member 22 will expand and this will increase the pressure in the bore 48 and increase the pressure applied against the valve members 62 and 72. Eventually this pressure will increase enough to move the member 62 against the member 60 closing the orifice 58. When this happens, communication between the supply conduit 24 and the chamber 92 is cutoff and the spring 98 will then restore the piston 94 to a position away from the valve seat 108 thereby reestablishing the return path from the evaportaor 18 to the suction line 30.

The end surface of the valve member 72 which is exposed to the control pressure produced by the bulb 22 is much larger than the end surface of the member 62 and it is therefore possible by proper selection of the spring 76 to accurately and precisely control the operation and operating condition of the subject valve 10. The operating condition can also be controlled and changed as aforesaid by means of the knob 84.

The temperature responsive device 38 can be of the same or similar construction as the device 22 and is employed to control the operation of the expansion device 20 in the supply conduit 24. The operation of an expansion device 20 involves well known principles and it is not deemed necessary to describe its operation in detail in this disclosure except to note that the expansion device 20 or some other similar means are necessary to the operation of the evaporator 18. It can thus be seen that the subject device as shown in FIG. 1 provides extremely accurate and sensitive means for controlling and regulating the temperature of a refrigerator or air conditioning unit or other similar device, and it accomplishes this using relatively small pressure differentials by combining the desirable features of a main and a pilot valve.

Figure 2:
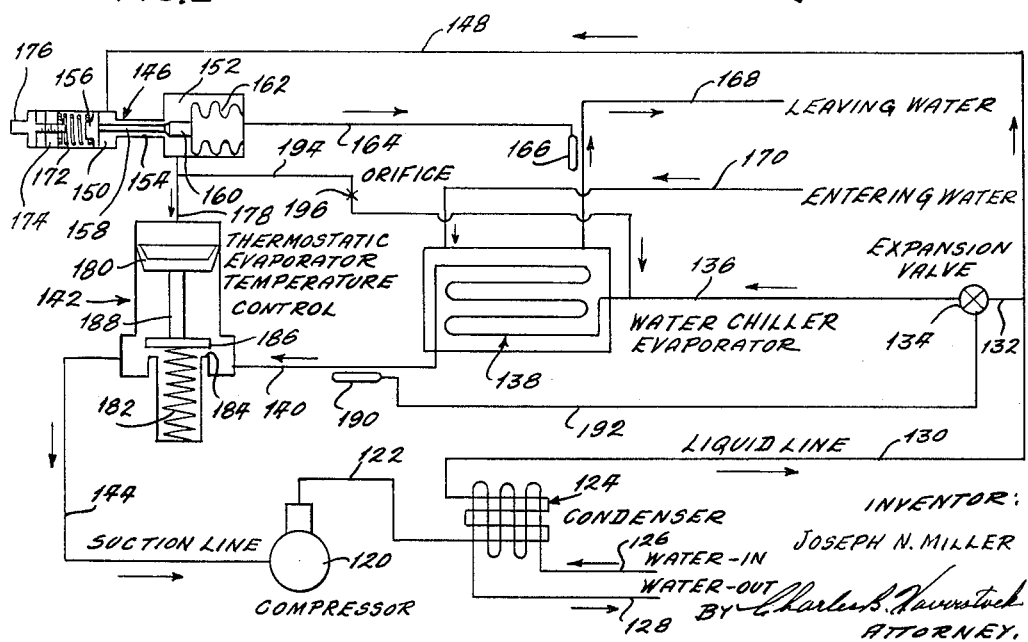
FIG. 2 is a schematic view showing a modified form of the subject control means and refrigeration system connected thereto.

FIG. 2 shows a modified form of refrigerator control system and a modified form of the valve control means therefor. In the modified system, a compressor 120 is shown having an outlet fluid supply line 122 connected to a condenser 124. The condenser 124 also has water line connections 126 and 128. The output side of the condenser 124 is connected to a supply conduit 130 which is connected to another conduit 132 and to an expansion device such as the valve 134. The outlet side of the expansion valve 134 is connected by conduit 136 to the inlet side of an evaporator coil 138, and the outlet side of the evaporator 138 is connected by a conduit 140 to a port on a main control valve 142. The control valve 142 is similar to the main valve portion 16 of the valve 10 of FIG. 1 and is connected in the evaporator return or suction line 144 which is connected back to the compressor 120.

The supply line 130 is also connected to a temperature controlled pilot valve 146 by another conduit 148. The pilot valve 146 includes a first chamber portion 150 which communicates with the conduit 148, a second chamber portion 152, and a passage 154 connected therebetween. The chamber portion 150 also has a movable member or piston 156 positioned therein, and the member 156 is connected to a rod 158 that extends through the connecting passage 154 and is connected at its opposite end to a valve member 160. The valve member 160 has a surface thereon that cooperates with the adjacent end of the passage 154 and controls communication therethrough. The valve member 160 is also connected to an expandable bellows structure 162 which is sealed in the chamber 152, and the interior of the bellows is connected by conduit 164 to a temperature responsive device 166. The temperature responsive device 166 is positioned adjacent to an outlet water conduit 168 which carries water or other fluid after it has passed through the evaporator 138 and been cooled thereby. Another conduit 170 supplies water to the evaporator 138.

A compression spring 172 is also positioned in the chamber 150 between one side of the piston 156 and an adjustable member 174. The location of the member 174 in the chamber 150 can be varied by a threaded adjustment member 176 which extends through the end wall of the valve 146. By adjusting the position of the member 174, the compression of the spring 172 can be varied and this in turn changes the force applied by the spring 172 against the piston 156. This also changes the operating condition of the valve.

The larger chamber portion 152 in the valve 146 is connected by conduit 178 to the main control valve 142 which has a movable piston 180 positioned therein. The piston is biased upwardly into an open condition in the valve 142 by means of spring 182. The main valve 142 also has a valve seat 184 which cooperates with a valve seat member 186 that is connected to the piston 180 by a rod 188. The operation of the main control valve 142 is similar to the operation of the main portion of the valve 10 shown in FIG. 1. For example, when the valve member 160 is in its open position, pressure from the supply conduit 148 is introduced into the main valve 142 above the piston 180 and moves the piston 180 downwardly thereby closing or partially closing the valve seat 184. By the same token, when the valve member 160 is seated, closing the passage 154, the spring 182 will operate to move the piston 180 upwardly thereby opening the valve 142 and providing a return path for fluid from the evaporator 138 through the suction line 144 to the compressor 120.

The modified system shown in FIG. 2 also has a temperature responsive device 190 which is connected to and controls the operation of the expansion device 134 in a well known way. The device 190 is connected to the expansion valve 134 by conduit 192.

Another fluid path is provided in the system through conduit 194 which is connected to the conduit 178 at a location between the valves 142 and 146 and at the opposite end to the conduit 136 which feeds the evaporator 138 from the expansion device 134. The conduit 194 has a restriction 196 of predetermined flow capacity at an intermediate location to provide a by-pass or pressure limiting circuit for across the piston 180. The restriction 196 therefore serves as a pressure limiting device in somewhat the same way as the orifice or passage 104 in the piston 94 of FIG. 1 except that in this case the conduit 194 and the orifice 196 feed back to the evaporator and therefore provide some additional fluid for cooling.

The operation of the modified system shown in FIG. 2 is similar to the operation of the system and valve shown in FIG. 1 but is designed more specifically for use with a water cooler or similar device such as might be used in the cooling tower of an air conditioning system. The system can also be used in other types of refrigeration and cooling systems as well.

Figure 3:
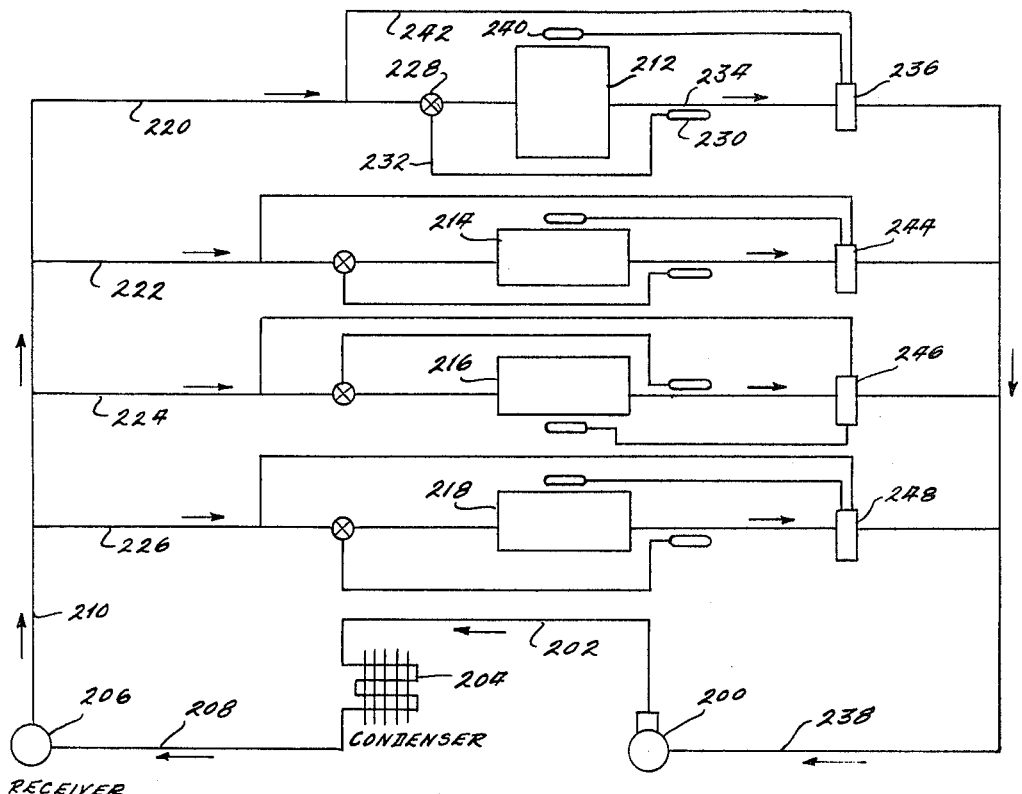
FIG. 3 is a schematic view showing another refrigeration system employing control means constructed according to the present invention.

FIG. 3 shows another modified system which includes control means constructed according to the present invention. The system of FIG. 3 includes a compressor 200 which is connected on its outlet or high pressure side by conduit 202 and to a condenser unit 204 and the outlet side of the condenser 204 is connected to a receiver unit 206 by another conduit 208. The receiver 206 feeds a fluid line 210 which is connected to a plurality of parallel refrigeration and/or air conditioning circuits. For illustrative purposes, the parallel circuits include an air conditioner evaporator 212 which is operated at approximately 40° F.; an evaporator 214 which is operated above freezing at about 35° F.; another evaporator 216 which is operated below freezing at about 10° F.; and another evaporator 218 which is operated at a still lower temperature. The evaporator 214 can be used for vegetable cooler units or the like, and the evaporator 216 and 218 can be used for devices such as deep freezes, ice cream freezer chests and the like.

The fluid supply line 210 is connected to parallel feeder lines 220, 222, 224 and 226 which respectively feed the evaporators 212, 214, 216 and 218. The feeder line 220, for example, is connected to an expansion device 228 which is positioned ahead of the air conditioning evaporator 212 and is controlled by a temperature sensitive element 230 which is connected to the expansion valve by a conduit 232. The temperature sensitive element 230 is positioned adjacent to a conduit 234 which is in the outlet of the evaporator 212. The conduit 234 is also connected to a control valve 236 similar to the control valves shown in FIGS. 1 and 2, and the outlet side of the valve 236 is connected back to the return side of the compressor by conduit 238. The valve 236 includes a main portion which controls the return flow from the evaporator 212 to the compressor 200 and a pilot control portion which is controlled by a temperature sensitive element 240 which is positioned in the airstream or other controlled environment produced by the evaporator 212. The pilot portion of the valve 236 also has a direct connection to the line 220 by way of conduit 242 which is similar to the conduit 28 in FIG. 1. Operation of the air conditioning circuit is similar to operation of the circuits shown in FIGS. 1 and 2.

The evaporators 214, 216 and 218 have similar control valves 244, 246, and 248 respectively to control their operations. Since these circuits operate in the same way as the circuit of the evaporator 212 it is not deemed necessary to describe each in detail. It should be remembered, however, that these circuits are controllable and regulable at different distinct temperatures even though they make use of the same compressor, condenser and receiver. Additional parallel circuits can also be added depending upon the capacity of the compressor and the other common elements.

Figure 4:
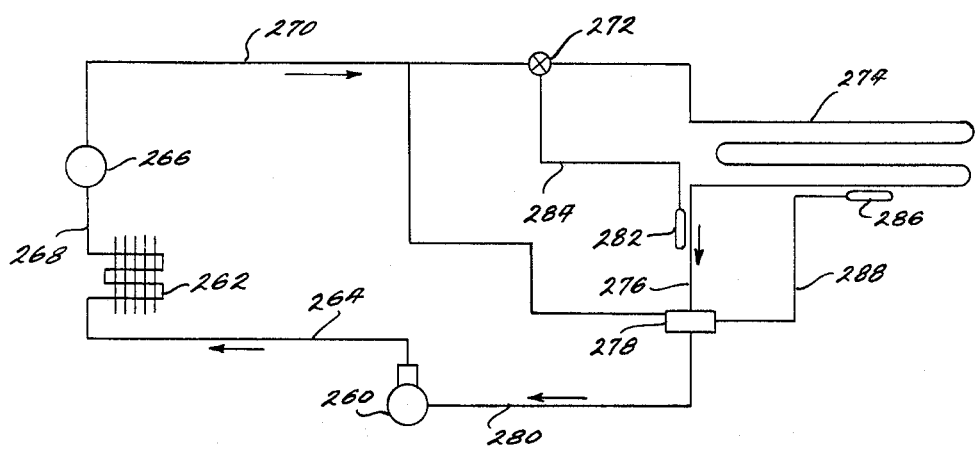
FIG. 4 is a schematic view of another modified system employing control means constructed according to the present invention.

FIG. 4 shows another circuit under control of similar control valve means which is designed specifically for use with automobile air conditioning systems and the like. The circuit of FIG. 4 includes a compressor 260 which is connected to a condenser 262 by a conduit 264. The outlet of the condenser 262 is connected to a receiver 266 by conduit 268, and the outlet of the receiver is connected by another conduit 270 to an expansion valve 272 which has its outlet connected to the inlet of an evaporator 274. The outlet of the evaporator is connected by conduit 276 to a control valve 278 which operates similarly to the control valves described above.

The control valve 278 is connected in the return line 280 of the compressor 260.

The expansion valve 272 is controlled by a temperature sensitive element 282 positioned adjacent to the conduit 276 and is connected thereto by a conduit 284. The control valve 278 has a pilot portion similar to the pilot portions of the valves described above, and also a main portion which controls flow from the evaporator to the suction side of the compressor 260. The pilot portion of the valve 278 is connected to a temperature sensitive element 286 by a conduit 288, and the temperature sensitive element is positioned in the evaporator airstream. Operation of the system disclosed in FIG. 4 is similar to the operation of the systems described above but is specifically adapted for use with an automobile air conditioning system or similar system. Therefore, it is not deemed necessary to describe in detail the construction or operation of the valve 278.

Figure 5:
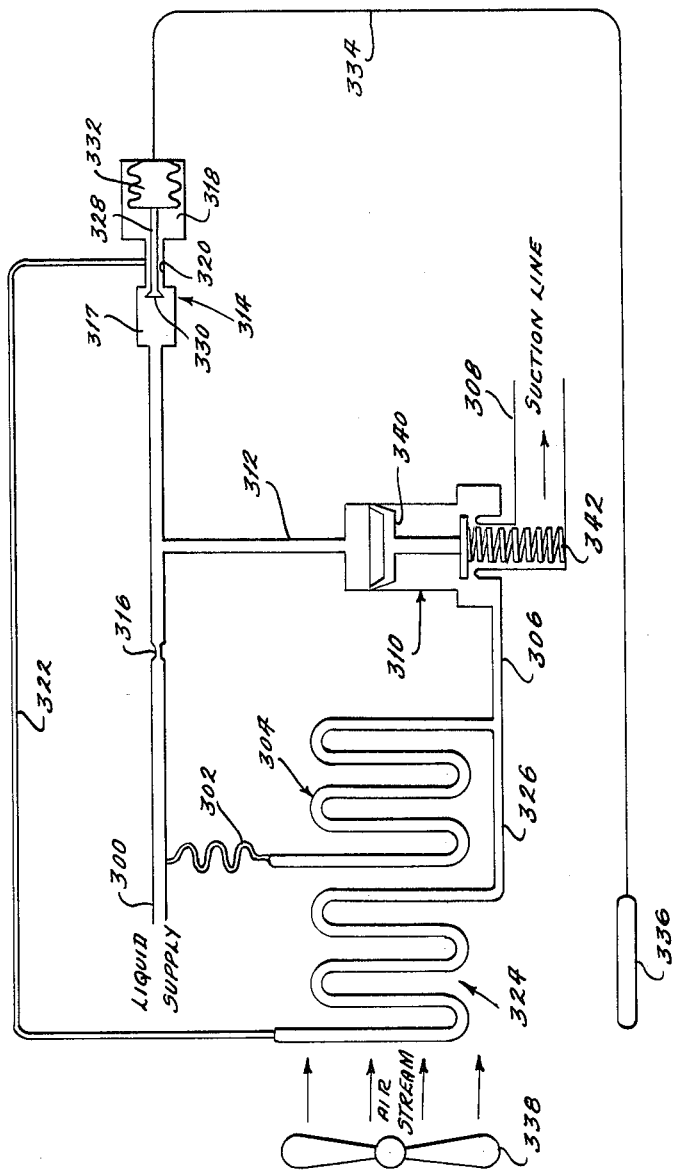
FIG. 5 is a schematic view of yet another modified system constructed according to the present invention.

Another modified cooling system is shown in FIG. 5 and includes a liquid supply conduit 300 which is connected to one end of a capillary tube 302. The opposite end of the capillary tube 302 is connected to the cooling coil of a first evaporator 304, and the opposite end of the evaporator coil 304 is connected to a return conduit 306. The return conduit 306 is connected to a suction line 308 of a compressor or other liquid source through a main control valve 310.

The liquid supply conduit 300 is also connected to the main control valve 310 by another conduit 312 as shown in the drawing and a pilot control valve 314. A pressure drop orifice 316 is provided in the supply conduit 300 at an intermediate location preferably between the connection to the capillary tube 302 and the connection to the conduit 312.

The pilot valve 314 includes a first chamber portion 317, a second chamber portion 318 and a connecting passage 320 therebetween. The connecting passage 320 has a connection at an intermediate location to one end of another capillary tube 322, and the opposite end of the capillary tube 322 is connected to a second evaporator coil 324. The opposite side of the evaporator coil 324 is connected to the return conduit 306 by another conduit 326.

The pilot valve 314 has a movable plunger member 328 positione d extending through the connecting passage 320. The plunger 328 has a valve portion 330 on one end and the opposite end is connected to a bellows structure 332 which is sealed in the chamber 318. The interior of the bellows structure 332 is connected by a conduit 334 to a temperature sensing bulb 336 which is positioned in the airstream that is blown through the evaporator coils 304 and 324 by suitable means such as the fan 338. The temperature sensing bulb 336 is filled with a suitable fluid which expands and contracts with changes in temperature and in so doing, expands or contracts the bellows 332. This in turn moves the plunger 328 in the pilot valve 314 and controls the opening and closing of the connecting passage 320. When the connecting passage 320 is open it communicates with the liquid supply line 300 and this condition occurs when the controlled temperature is too high relative to the valve setting. Under this condition the supply fluid will be fed into the capillary tube 322 and through the evaporator coil 324 in addition to the flow through the evaporator 304 to increase the total amount of cooling produced by the system. However, when the temperature sensed by the temperature sensing element 336 is too low relative to the valve setting, the bellows 332 will contract and this will close or partially close the valve member 330 thereby restricting or preventing communication between the liquid supply line 300 and the capillary tube 322. Under this condition, substantially only the evaporator 304 will be able to produce cooling.

In the modified construction of FIG. 5 the orifice 316 is provided as a pressure drop device and acts somewhat like a capillary device to divide the flow between the two evaporators 304 and 324. The orifice 316 also acts to enable the pilot valve 314 to control the operation of main valve 310 in the return path of both evaporators. For example, when the valve 330 is closed, substantially the full liquid supply pressure will be applied in the conduit 312 and in the chamber of the main valve 310 above the upper end of the main valve piston 340. This will cause the piston 340 to move downwardly thereby closing or restricting the flow from the line 306 to the suction line 308. On the other hand, when the pilot valve is open the pressure in in the conduit 312 and in the main valve 310 will be reduced because part of the pressure will be taken up by the flow through the second evaporator 324. This will cause spring 342 to move the piston 340 upwardly in the main valve 310 opening the valve and increasing the total cooling produced by the evaporators.

The subject control means are not limited to use with the particular systems described and many other uses and applications thereof will suggest themselves. Generally speaking, however, the means described are particularly well suited for the control of air conditioning, refrigeration, and cooling systems such as those disclosed hereinabove and the valve means are provided to control the liquid flow from the cooling unit or evaporator to the return side of the liquid source.

Thus there has been shown and described novel control valve means and novel systems in which said control valve means are employed which valve means and systems fulfill all of the objects and advantages sought therefor. Many changes, alterations, and modifications of the above described control means and systems will, however, become apparent to those skilled in the art after considering this specification and the accompanying drawings. All such changes, alterations and modifications which do not depart from the spirit and scope of the invention are deemed to be covered by the invention which is limited only by the claims which follow.

What is claimed is:

1. Means for controlling the temperature in a cooling system or the like comprising a cooling system having a compressor with a high pressure outlet and a suction return line, a condenser, an expansion device, and an evaporator serially connected between the high pressure outlet of the compressor and the suction return line thereof, temperature sensitive means positioned adjacent to the evaporator on the outlet side and connected to the expansion device for controlling the operation thereof, and valve means for controlling the return line from the evaporator back to the compressor, said last named means including a main valve portion having a main valve seat in the return line and a movable member engageable with said seat to control flow therethrough, and pilot valve means for controlling the operation of the main valve portion, said pilot valve means including a chamber having a valve seat therein, an inlet to the chamber connected to the high pressure outlet side of the compressor, and an outlet from the chamber connected to the main valve portion on one side of the movable member therein, and means for controlling the pilot valve means including a piston movable relative to the pilot valve seat, a temperature responsive device positioned adjacent to the evaporator and responsive to the temperature thereof, said temperature responsive device producing a control condition which varies with changes in said temperature, means connecting said temperature responsive device to the pilot valve chamber on one side of the pilot piston to control the position of said piston relative to the pilot valve seat, and means for limiting the pressure at the outlet side of the pilot valve means including a connection between said outlet and the inlet side of the evaporator.

2. A cooling system comprising a liquid source having a high pressure liquid supply line and a return line, a first expansion device and a first evaporator in series connected between the liquid supply line and the return line, said first evaporator having an outlet connected to the return line, a second expansion device and a second evaporator in series, a pressure responsive control valve in said return line, and pilot valve means for controlling the said control valve, said pilot valve means having an inlet connected to the liquid supply, an outlet connected to the second expansion device in series with the second evaporator, and means connecting said second evaporator to the return line, means for controlling the operation of the pilot valve means in response to a controlled temperature produced by at least one of said evaporators, and means for dividing the flow of liquid from the liquid source between said first and said second evaporators whenever the pilot valve is open, said control valve including means normally biasing it into an open condition, said control valve moving toward a closed condition whenever the pilot valve means moves toward a closed condition.

3. A control valve for refrigeration systems and the like comprising a main valve portion including a housing with a chamber therein, an inlet port to the chamber, an outlet port to the chamber, a valve seat positioned in the chamber between said inlet and outlet ports and located to provide substantially linear flow therebetween when the valve is open, and a main valve member movable in said chamber in response to pressure changes produced thereacross, said member cooperating with said valve seat to control communication between the inlet and outlet ports; and pilot valve means for controlling the position of the said movable member in the chamber comprising a pilot valve portion including a housing having a pilot chamber with a valve seat therein, an inlet port connecting the pilot chamber on one side of said pilot valve seat to a relatively high pressure source, an outlet port on the other side of the pilot valve seat connecting the pilot chamber to the main valve chamber on one side of the movable main valve member, a pilot valve member movable in said pilot chamber, said pilot valve member having a surface which moves relative to the pilot valve seat to meter communication therethrough, and means including a bulb with a control fluid capable of expanding and contracting with temperature changes positioned to respond to a predetermined temperature in the refrigeration system, means directly connecting said bulb to the pilot chamber on one side of the movable pilot valve member for changing the position of said movable member relative to the valve seat in response to changes in the predetermined system temperature.

4. The control valve defined in claim 3 wherein means are provided for adjusting the temperature at which the pilot valve member engages the pilot valve seat, said adjusting means including a second movable member positioned in the pilot chamber in position to be exposed to the control fluid in the bulb.

5. The control valve defined in claim 4 wherein means are provided for adjusting the operating position of said second movable member in the pilot valve chamber relative to the pilot valve movable member.

6. A valve for controlling a refrigeration device or the like comprising a main valve portion including a housing with a chamber therein, an inlet port to said chamber, an outlet port to said chamber, a valve seat between said inlet and outlet ports in position to provide substantially linear flow between the inlet and outlet ports when the valve is open, and a main valve member movable in said chamber between a position engaging said valve seat to prevent communication between the inlet and the outlet ports and a position spaced from said valve seat to establish communication therebetween; and a pilot valve operatively connected to said main valve for controlling the position of said movable valve member, said pilot valve including a chamber having an inlet adapted to be connected to a relatively high pressure source, an outlet adapted to be connected to the chamber of the main valve portion on one side of the movable valve member therein, a pilot valve seat positioned between the inlet and outlet, and a pilot valve member movable relative to said pilot valve seat, said pilot valve member having a surface thereon shaped to cooperate with the pilot valve seat to control and meter communication therethrough between the high pressure source and the main valve chamber on one side of the movable valve member therein, means for controlling the position of the pilot valve member relative to the pilot valve seat including a temperature responsive element positioned to respond to a predetermined temperature to be controlled, said temperature responsive element producing control pressure which varies proportional to the predetermined temperature, and means directly communicating said temperature responsive element to the pilot valve chamber on the opposite side of the pilot valve member from the valve seat to control the position of the pilot valve member relative to the pilot valve seat.

7. The valve defined in claim 6 including a second movable member in the pilot valve chamber in position to be exposed to the control pressure produced by the temperature responsive element, and means for changing the operating position of said second movable member in the pilot valve chamber.

8. The valve defined in claim 7 wherein said second movable member has a larger surface area thereon exposed to the control pressure than the pilot valve member.

9. The valve defined in claim 6 wherein said pilot valve includes an expandible bellows structure connected thereto and exposed to the control pressure produced by the temperature responsive element.

10. Means for controlling the flow in a refrigeration system or the like which system includes an expansion device and an evaporator serially connected between a high pressure fluid source and a return line to the fluid source, the improvement comprising means for controlling flow through the return line from the evaporator to the source including a valve having a main valve portion in the return line and a pilot valve portion responsive to a temperature produced by the evaporator for controlling the main valve portion, said main valve portion having a main valve seat and a main movable valve member that is normally biased into an open position, said pilot valve portion including means providing a controlled connection between the relatively high pressure fluid source and the main valve portion to apply predetermined pressure against the main movable valve member in a direction to move the main valve member toward a closed condition engaging the main valve seat, means for controlling flow through said controlled connection including a pilot valve seat and a pilot valve member movable relative thereto, a temperature sensitive element positioned to respond to a controlled temperature produced by the evaporator, said temperature sensitive element producing a volume change in a control fluid which varies with changes in said controlled temperature, and means directly communicating said temperature sensitive element to the pilot valve means to communicate said control fluid to one side of the pilot valve member to predeterminately position said member relative to the pilot valve seat.

11. The means defined in claim 10 wherein said pilot valve portion includes a second movable member spaced from the aforesaid pilot valve movable member and exposed to the control fluid, said second movable member having a greater surface area exposed to the control fluid than the pilot movable member, and means for predeterminately adjusting the position of said second movable member relative to the pilot movable member to change the operating conditions of the main and pilot valve portions.

12. A refrigeration system or the like comprising a fluid supply source, means for connecting said source to a system including an expansion device serially connected to an evaporator to be controlled, and a return line back to the source from the evaporator, temperature sensitive means positioned adjacent to the evaporator and connected to the expansion device for controlling the operation thereof, and main valve means for controlling flow through the return line from the evaporator to the source, said main valve means including a main valve seat in the return line and a main valve member movable relative to said seat to control flow therethrough, and pilot valve means for controlling the operation of said main valve means, said pilot valve means including a chamber having a valve seat therein, an inlet to the chamber on one side of the pilot valve seat and means communicating the inlet to a relatively high pressure point in the system relative to pressure of the evaporator being controlled thereby, an outlet from the pilot valve chamber on the other side of the pilot valve seat connected to communicate with the main valve means on one side of the main movable valve member, means for controlling the pilot valve means including a pilot piston movable relative to the pilot valve seat to control and meter communication therethrough, temperature responsive means positioned to respond to a temperature produced by the evaporator, said temperature responsive means producing a control condition which varies with changes in said temperature, and means directly communicating said temperature responsive means to the pilot valve chamber on one side of the pilot piston to control the position of said pilot piston relative to the pilot valve seat.

13. The system defined in claim 12 wherein said pilot valve means includes an expandible bellows structure operatively connected to the pilot piston, said bellows structure also having a connection to the temperature responsive means.

14. The system defined in claim 13 wherein means are provided for adjusting the operating condition of the pilot valve means, said means including means for throttling the pilot valve means in response to a predetermined evaporator control temperature and a corresponding control pressure in the bellows structure.

15. The system defined in claim 12 wherein said temperature responsive means includes a bulb containing fluid which expands and contracts with changes in the control temperature.

16. The system defined in claim 12 wherein a plurality of parallel circuits are connected in the system between the fluid supply source and the return line to the source, each of said circuits including an expansion device and an evaporator to be controlled, and at least one of said circuits having valve means therein including a main valve seat in the connection to the return line, and pilot valve means responsive to a control temperature produced by the associated evaporator.

17. Means for controlling the temperature in a cooling system or the like comprising a cooling system having a compressor with a high pressure outlet and a suction return line, a condenser, an expansion device, and an evaporator serially connected between the high pressure outlet of the compressor and the suction return line thereof, and valve means for controlling the return line from the evaporator back to the compressor, said last named means including a main valve portion having a main valve seat in the return line and a movable member engageable with said seat to control flow therethrough, and pilot valve means for controlling the operation of the main valve portion, said pilot valve means including a chamber having a valve seat therein, an inlet to the chamber and means communicating the inlet to a relatively high pressure point in the system relative to the pressure of the evaporator controlled thereby, an outlet from the chamber connected to the main valve portion on one side of the movable valve member therein, means for controlling the pilot valve means including a pilot piston movable relative to the pilot valve seat to control and meter communication therethrough, temperature responsive means positioned to respond to a temperature produced by the evaporator, said temperature responsive means producing a control condition which varies with changes in said temperature, means directly communicating said temperature responsive means to the pilot valve chamber on one side of the pilot piston to control the position of said piston relative to the valve seat, and means limiting the pressure at the outlet side of the pilot valve means.

18. The means for controlling the temperature in a cooling system or the like defined in claim 17 wherein said pilot piston and said pilot valve seat have tapered relatively movable surfaces which cooperate to accurately meter communication between the relatively high pressure point in the system and the main valve portion responsive to the controlled evaporator temperature.

References Cited by the Examiner

UNITED STATES PATENTS

| 2,161,312 | 6/1939 | Pritchard | 62—217 X |
| 2,273,535 | 2/1942 | Peo | 62—217 X |
| 2,401,144 | 5/1946 | Dube | 62—217 X |
| 2,571,625 | 10/1951 | Seldon | 62—225 |
| 2,993,348 | 7/1961 | Boyle | 62—217 |

MEYER PERLIN, *Primary Examiner.*